US012420993B2

(12) United States Patent
Lin

(10) Patent No.: US 12,420,993 B2
(45) Date of Patent: Sep. 23, 2025

(54) COVER BODY STRUCTURE AND BOTTLE THEREOF

(71) Applicant: Shenzhen Zhongmin Technology Co., Ltd., Guangdong (CN)

(72) Inventor: Yitong Lin, Guangdong (CN)

(73) Assignee: Shenzhen Zhongmin Technology Co., Ltd., Shenzhen (CN)

( * ) Notice: Subject to any disclaimer, the term of this patent is extended or adjusted under 35 U.S.C. 154(b) by 138 days.

(21) Appl. No.: 18/394,164

(22) Filed: Dec. 22, 2023

(65) Prior Publication Data

US 2025/0051066 A1    Feb. 13, 2025

(30) Foreign Application Priority Data

Aug. 9, 2023   (CN) .......................... 202310997558.0

(51) Int. Cl.
*B65D 47/20* (2006.01)
*A47G 19/22* (2006.01)
*B65D 51/18* (2006.01)
*B65D 55/02* (2006.01)

(52) U.S. Cl.
CPC ..... *B65D 47/2018* (2013.01); *A47G 19/2266* (2013.01); *B65D 51/18* (2013.01); *B65D 55/02* (2013.01); *B65D 2555/02* (2013.01)

(58) Field of Classification Search
CPC .. B65D 47/2018; B65D 47/20; B65D 43/164; B65D 43/16; B65D 51/18; B65D 51/04; B65D 55/02; A47G 19/2266; A47G 19/2272; A47G 19/2222

USPC ........ 220/708, 705, 830, 827, 810; 215/388, 215/229, 228, 244, 237, 235
See application file for complete search history.

(56) References Cited

U.S. PATENT DOCUMENTS

| | | | | |
|---|---|---|---|---|
| 5,203,468 A * | 4/1993 | Hsu | ................... | B65D 47/2037 222/530 |
| 5,282,541 A * | 2/1994 | Chen | .................. | A47G 19/2266 220/254.1 |
| 5,582,320 A * | 12/1996 | Lin | ..................... | B65D 47/2043 215/229 |
| 8,622,229 B2 * | 1/2014 | Lane | ...................... | B65D 43/26 215/388 |
| 8,689,989 B2 * | 4/2014 | Lane | ......................... | A45F 3/16 220/264 |

(Continued)

FOREIGN PATENT DOCUMENTS

WO      WO-9846106 A1 * 10/1998  ......... B65D 47/2037

*Primary Examiner* — Robert J Hicks

(57) ABSTRACT

Disclosed is a cover body structure and a bottle thereof. The cover body structure includes: a rotary cover, a dust-proof cap, a driving assembly, and a toggle member. The rotary cover is provided with a straw and the dust-proof cap is rotatably connected to the rotary cover, to enable the dust-proof cap and the rotary cover to have a buckled state and a flip state. By connecting one end of the driving assembly to the dust-proof cap, rotatably disposing the toggle member on the rotary cover, and rotatably connecting the other end of the driving assembly to the toggle member, the toggle member can be driven to enable the toggle member to rotate to a liquid path blocked state in which the straw is bent in the buckled state and rotate to a liquid path conducted state in which the straw is rebounded and restored in the flip state.

18 Claims, 10 Drawing Sheets

(56) References Cited

U.S. PATENT DOCUMENTS

| | | | |
|---|---|---|---|
| 2002/0036207 A1* | 3/2002 | Ohuo | B65D 47/0885 |
| | | | 222/536 |
| 2012/0312832 A1* | 12/2012 | Lane | B65D 51/242 |
| | | | 220/774 |
| 2023/0312179 A1* | 10/2023 | Meyers | B65D 25/2835 |
| | | | 220/200 |
| 2023/0382607 A1* | 11/2023 | Chan | A47G 19/2266 |

* cited by examiner

COVER BODY STRUCTURE AND BOTTLE THEREOF

CROSS REFERENCE TO RELATED APPLICATIONS

The present application claims the benefit of Chinese Patent Application No. 202310997558.0 filed on Aug. 9, 2023, the contents of which are incorporated herein by reference in their entirety.

TECHNICAL FIELD

The present invention relates to the technical field of vessels, and in particular, to a cover body structure and a bottle thereof.

BACKGROUND

At present, a flip type bottle cover is closed in a manner in which a dust-proof cap is in contact with and rigidly presses against a straw. In the structure, a force between the dust-proof cap and a rotary cover is excessively large, and a gap between the dust-proof cap and the rotary cover becomes larger over long-term use, resulting in deformation of the flip cover, which is prone to cause water leakage.

SUMMARY

An objective of the present invention is to provide a cover body structure and a bottle thereof, which aim to solve the technical problem of water leakage of an existing bottle cover.

To solve the foregoing problem, according to an aspect of this application, an embodiment of the present invention provides a cover body structure. The cover body structure includes:
- a rotary cover, where the rotary cover is provided with a straw;
- a dust-proof cap, where the dust-proof cap is rotatably connected to the rotary cover, to enable the dust-proof cap and the rotary cover to have a buckled state and a flip state;
- a driving assembly, where one end of the driving assembly is connected to the dust-proof cap; and
- a toggle member, where the toggle member is rotatably disposed on the rotary cover, and the other end of the driving assembly is rotatably connected to the toggle member, to drive the toggle member to rotate, to enable the toggle member to rotate to a liquid path blocked state in which the straw is bent in the buckled state and rotate to a liquid path conducted state in which the straw is rebounded and restored in the flip state.

In some embodiments, the straw is disposed on the rotary cover at a position away from a rotation axis of the dust-proof cap; and/or, the toggle member includes a toggle plate, a connecting plate, and a fixing plate, the toggle plate is attached to the straw, the fixing plate is disposed on a side of the toggle plate facing the fixing plate, the fixing plate is provided with an installation hole fitted with the straw, the installation hole is provided with an installation opening on a side away from the toggle plate, a width of the installation opening is smaller than a diameter of the straw, the rotary cover is provided with a supporting part, the supporting part is provided with a first insertion hole, the connecting plate is connected to the toggle plate, the connecting plate is provided with a first rotating shaft fitted with the first insertion hole, and the other end of the driving assembly is rotatably connected to the connecting plate.

In some embodiments, the dust-proof cap is rotatably connected to the rotary cover through a second rotating shaft, the driving assembly includes a first driving member and a second driving member that are rotatably connected, the first driving member is rotatably connected to the rotary cover through the second rotating shaft, the second driving member is rotatably connected to the toggle plate, the first driving member is provided with a limiting protrusion, and the dust-proof cap is provided with a first abutting part abutted against and coordinated with the limiting protrusion, so that in the flip state, the first driving member drives the second driving member to drive the toggle plate to rotate around the first rotating shaft to the liquid path conducted state.

In some embodiments, the dust-proof cap is provided with a first abutting part, and the first driving member is provided with a second abutting part abutted against and coordinated with the first abutting part, so that in the buckled state, the first driving member drives the second driving member to drive the toggle plate to rotate around the first rotating shaft to the liquid path blocked state.

In some embodiments, two first driving members and two second driving members are included, a connecting member is arranged between the two second driving members, the two first driving members are arranged on two sides of the two second driving members, the two first driving members are each provided with a second insertion hole on a side approaching each other, and the two second driving members are each provided with a third rotating shaft fitted with the second insertion hole.

In some embodiments, two connecting plates are included, the two connecting plates are arranged in parallel and spaced apart on two sides of the toggle plate, the toggle plate is located on a side of the straw away from the first driving member, the two second driving members are located between the two connecting plates, the two second driving members are each provided with a fourth rotating shaft on a side facing away from each other, and the two connecting plates are each provided with a third insertion hole fitted with the fourth rotating shaft.

In some embodiments, two supporting parts are included, the two connecting plates are located between the two supporting parts, the two connecting plates are each provided with a first rotating shaft on a side facing away from each other, and the two supporting parts are each provided with the first insertion hole.

In some embodiments, an outer wall of the dust-proof cap is provided with a hanging buckle, an outer wall of the rotary cover is rotatably provided with a press button, the press button is provided with a hanging slot fitted with the hanging buckle, an end of the press button away from the hanging slot is provided with a press part, a rotation axis of the press button is located between the hanging slot and the press part, and an elastic member is sandwiched between the rotary cover and the press part.

In some embodiments, the outer wall of the dust-proof cap is provided with a hanging part extending radially outward, and the press button is rotatably provided with a safety buckle capable of being hung and locked with the hanging part.

According to another aspect of this application, an embodiment of the present invention further provides a bottle, where the bottle includes the cover body structure described above.

Compared with the prior art, the cover body structure of the present invention has at least the following beneficial effects:

An embodiment of the present invention discloses a cover body structure. The cover body structure includes: a rotary cover, a dust-proof cap, a driving assembly, and a toggle member. The rotary cover is provided with a straw, and the dust-proof cap is rotatably connected to the rotary cover, to enable the dust-proof cap and the rotary cover to have a buckled state and a flip state. In this embodiment, by connecting one end of the driving assembly to the dust-proof cap, rotatably disposing the toggle member on the rotary cover, and rotatably connecting the other end of the driving assembly to the toggle member, the toggle member can be driven to rotate, to enable the toggle member to rotate to a liquid path blocked state in which the straw is bent in the buckled state and rotate to a liquid path conducted state in which the straw is rebounded and restored in the flip state. Therefore, the dust-proof cap, when opened, drives the driving assembly to further drive the toggle member to rotate until the straw is rebounded and restored, so as to implement conduction of a liquid path of the straw for a user to suck, and the dust-proof cap, when closed, drives the driving assembly to further drive the toggle member to rotate to bend the straw, so as to block the liquid path of the straw, thereby preventing a liquid from flowing out. In this embodiment, a force direction between the rotary cover and the dust-proof cap is changed by the driving assembly and the toggle member, and the toggle member is rotatably disposed on the rotary cover, so that after the toggle member bends the straw, a restoring elastic force of the straw is transferred to the rotary cover mainly by the toggle member. Therefore, by reducing a stress between the rotary cover and the dust-proof cap, water leakage due to deformation caused by an excessively large abutting force between the rotary cover and dust-proof cap resulted from direct clamping of the straw by the rotary cover and the dust-proof cap can be avoided, and the quality of products is improved.

In another aspect, the bottle provided in the present invention is manufactured based on the cover body structure, and its beneficial effects are referred to in the foregoing beneficial effects of the cover body structure, which will not be repeated herein.

The foregoing description is only an overview of the technical solutions of the present invention. To understand the technical means of the present invention more clearly and implement the technical means according to the content of the specification, the preferred embodiments of the present invention are described in detail below with reference to the accompanying drawings.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

Figure 1:
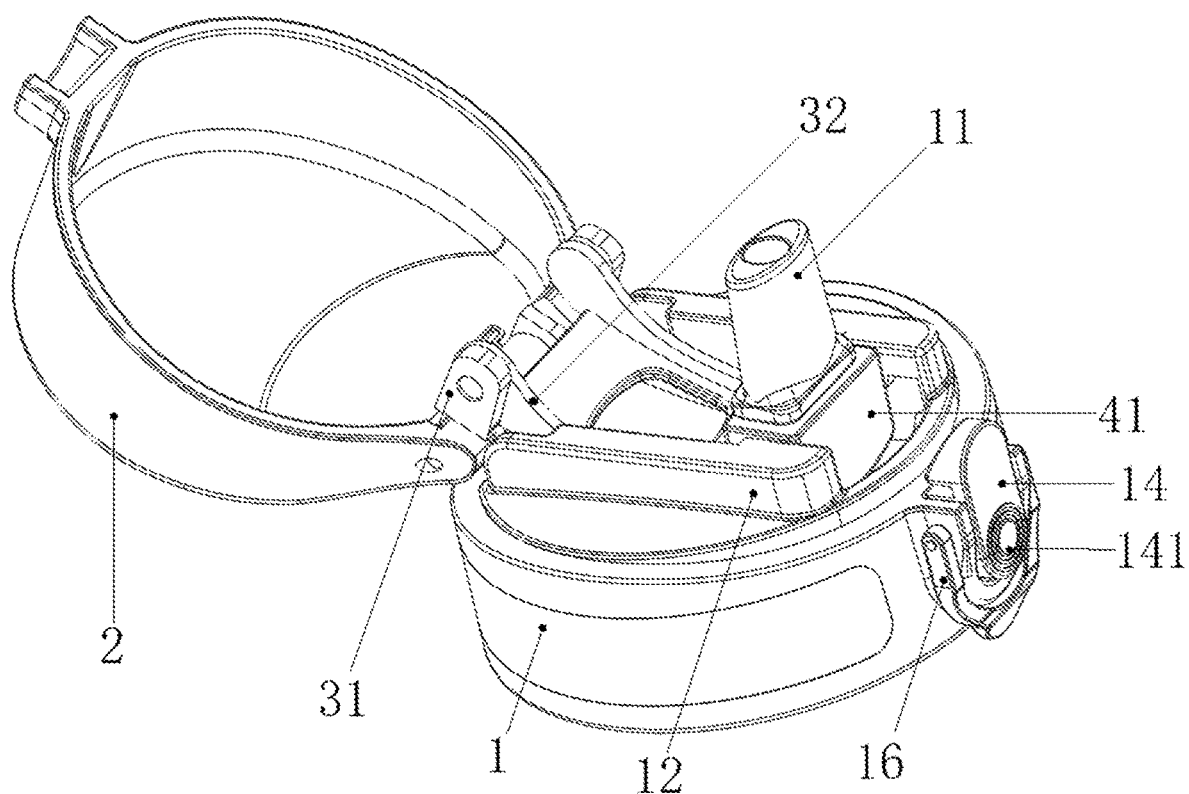
FIG. 1 is a schematic structural diagram of a cover body structure according to an embodiment of the present invention.
Figure 2:
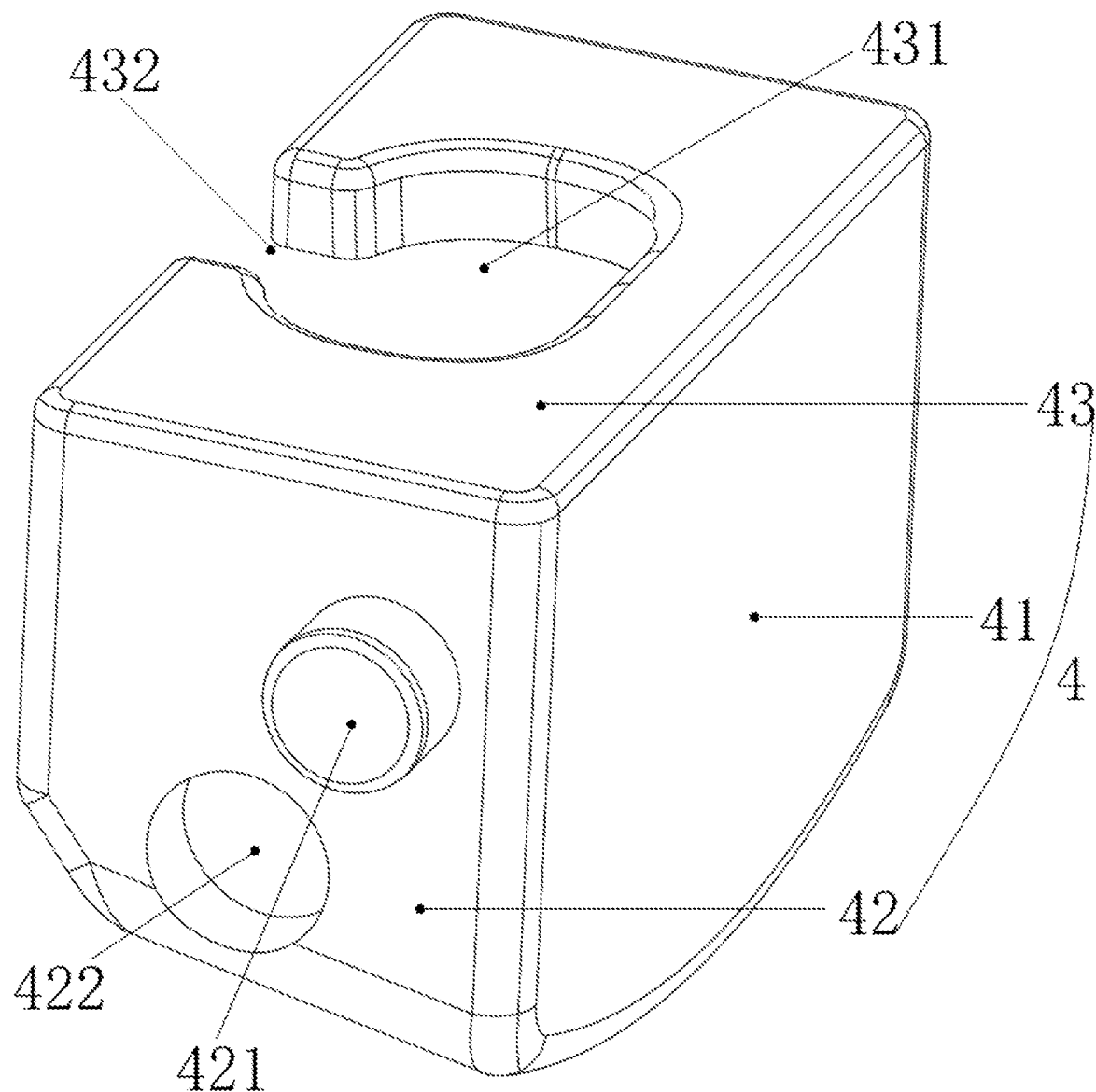
FIG. 2 is a schematic structural diagram of a toggle member of a cover body structure according to an embodiment of the present invention.
Figure 3:
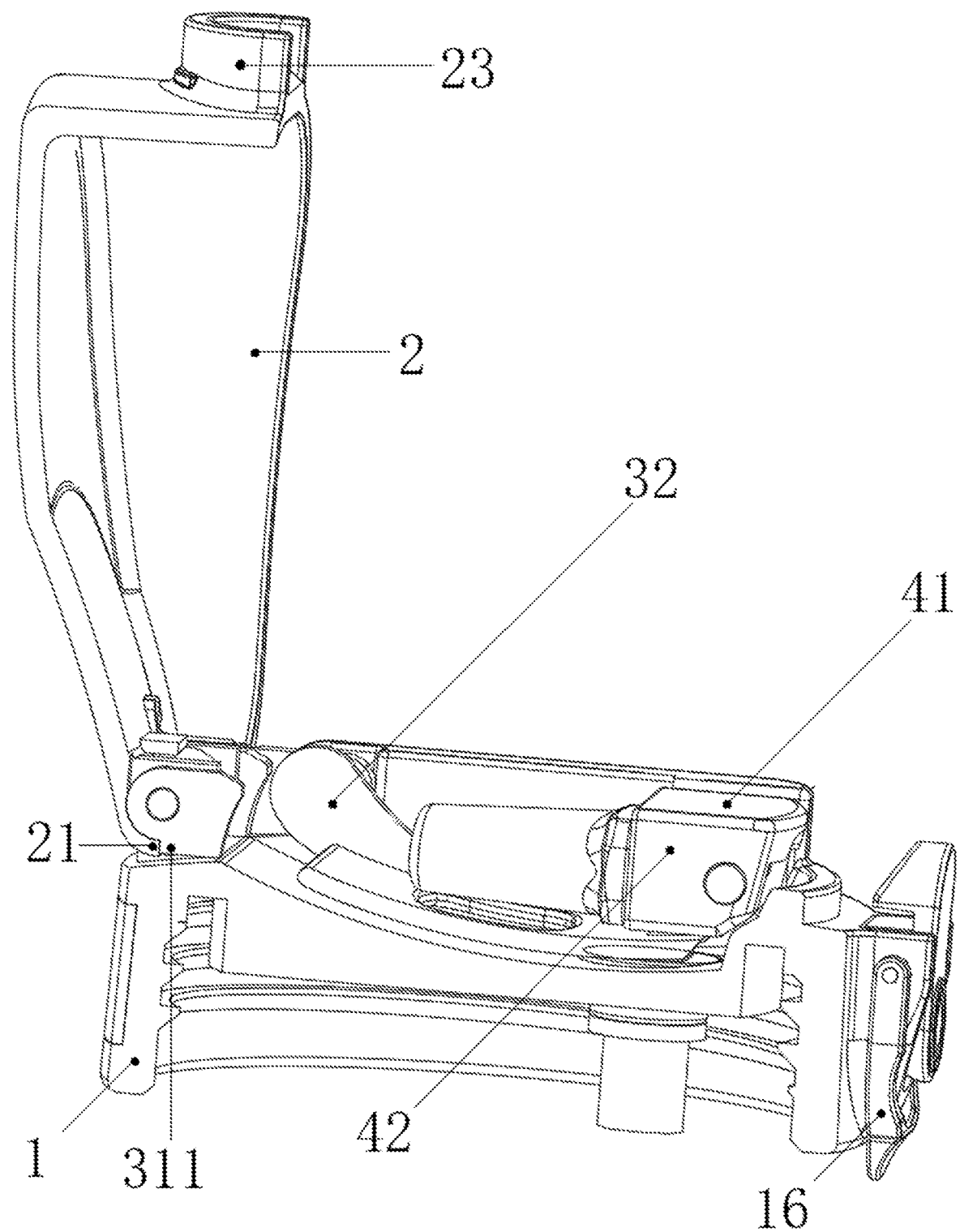
FIG. 3 is a three-dimensional cross-sectional view of a cover body structure according to an embodiment of the present invention.
Figure 4:
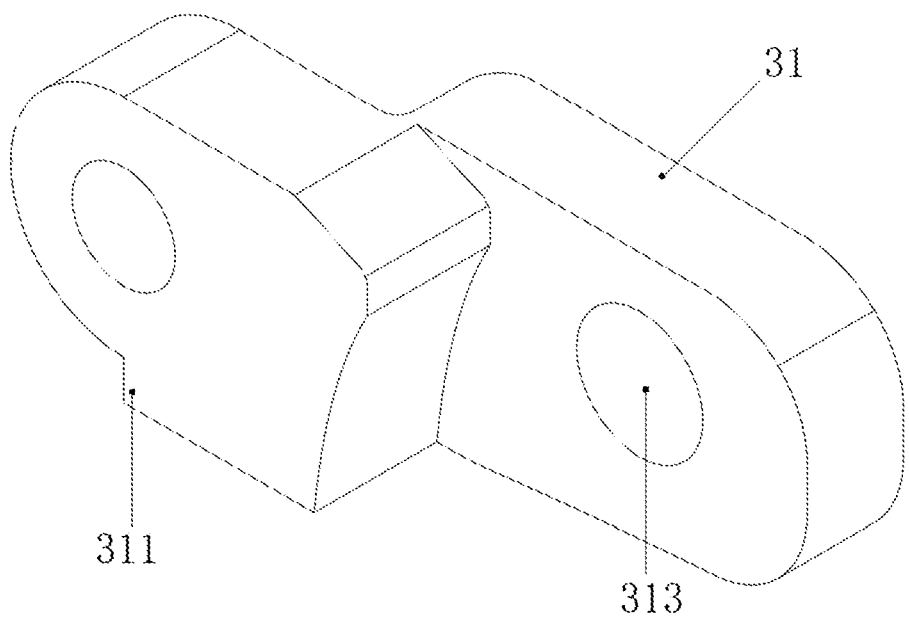
FIG. 4 is a schematic structural diagram of a first driving member of a cover body structure according to an embodiment of the present invention.
Figure 5:
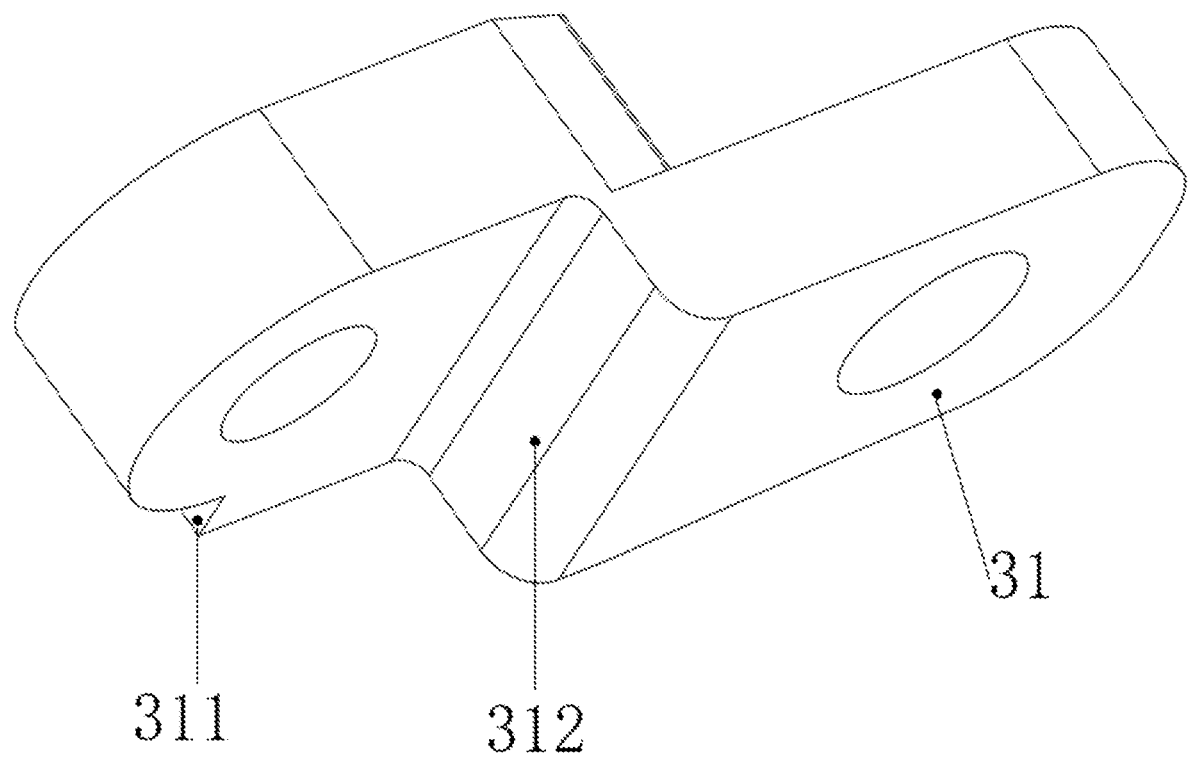
FIG. 5 is a schematic structural diagram of the first driving member of the cover body structure from another perspective according to the embodiment of the present invention.
Figure 6:
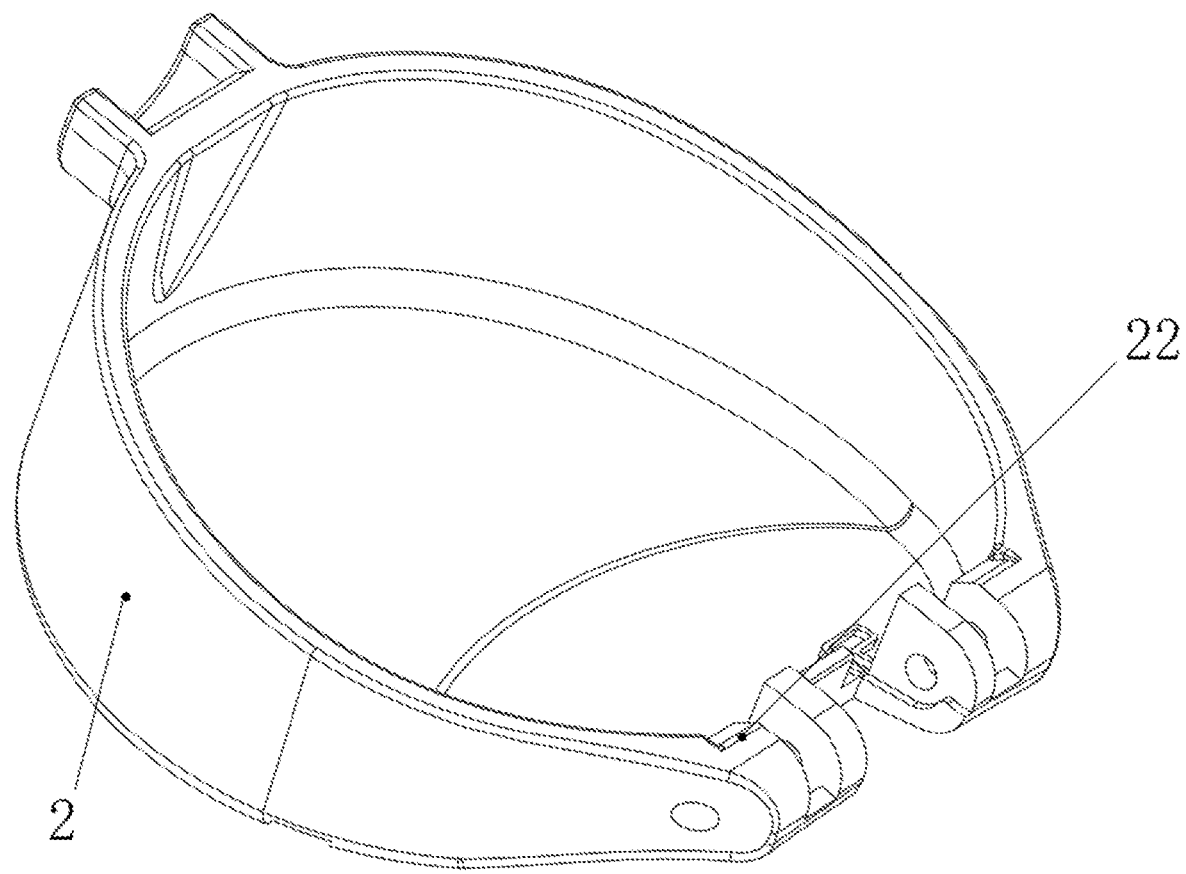
FIG. 6 is a schematic structural diagram of a dust-proof cap of a cover body structure according to an embodiment of the present invention.

DESCRIPTIONS OF REFERENTIAL NUMERALS 1. rotary cover; 11. straw; 12. supporting part; 121. first insertion hole; 13. second rotating shaft; 14. press button; 141. press part; 142. hanging slot; 15. elastic member; 16. safety buckle; 17. pin shaft; 18. restoring spring;
2. dust-proof cap; 21. first abutting part; 22. second abutting part; 23. hanging part; 24. hanging buckle;
3. driving assembly; 31. first driving member; 311. limiting protrusion; 312. third abutting part; 313. second insertion hole; 32. second driving member; 321. connecting member; 322. third rotating shaft; 323. fourth rotating shaft;
4. toggle member; 41. toggle plate; 42. connecting plate; 421. first rotating shaft; 422. third insertion hole.

DETAILED DESCRIPTION

To further explain the technical means and effects of the present invention to achieve the intended creative objective, the specific implementation, structure, features, and effects of this application according to the present invention will be described in detail below in combination with the accompanying drawings and preferred embodiments. In the following description, different "one embodiment" or "embodiment" does not necessarily refer to a same embodiment. Furthermore, the particular features, structures, or characteristics of one or more embodiments may be combined in any suitable manner.

In the description of the present invention, it is to be clarified that the specification, claims, and accompanying drawings of the present invention, and terms such as "first" and "second" are used to distinguish similar objects, but are unnecessarily used to describe a specific sequence or order. The terms "vertical", "lateral", "longitudinal", "front", "rear", "left", "right", "upper", "lower", "horizontal", and the like indicate that the orientation or positional relationship is based on the orientation or positional relationship shown in the accompanying drawings, are merely for the convenience of describing the present invention, and do not mean that the apparatus or element referred to need to have a specific orientation or position. Therefore, the terms cannot be construed as limiting the present invention.

In the description of the present invention, it is to be noted that, unless otherwise clearly defined and limited, the terms "mount", "connected", and "connection" should be understood in a broad sense, for example, the elements may be connected fixedly, or may also be connected detachably, or connected integrally; the connection may be a mechanical connection or an electrical connection; and the connection may be direct connection or indirect connection through an intermediate medium. For a person of ordinary skill in the art, the specific meaning of the above terms in the present invention can be understood in specific situations.

Embodiment 1

As shown in FIG. 1 to FIG. 13, an embodiment of the present invention provides a cover body structure. The cover body structure includes:

a rotary cover 1, where the rotary cover 1 is provided with a straw 11;

a dust-proof cap 2, where the dust-proof cap 2 is rotatably connected to the rotary cover 1, to enable the dust-proof cap 2 and the rotary cover 1 to have a buckled state and a flip state;

a driving assembly 3, where one end of the driving assembly 3 is connected to the dust-proof cap 2; and a toggle member 4, where the toggle member 4 is rotatably disposed on the rotary cover 1, and the other end of the driving assembly 3 is rotatably connected to the toggle member 4, to drive the toggle member 4 to rotate, to enable the toggle member 4 to rotate to a liquid path blocked state in which the straw 11 is bent in the buckled state and rotate to a liquid path conducted state in which the straw 11 is rebounded and restored in the flip state.

In this embodiment, the cover body structure includes: a rotary cover 1, a dust-proof cap 2, a driving assembly 3, and a toggle member 4. The rotary cover 1 is provided with a straw 11. The straw 11 is configured to suck water. The dust-proof cap 2 is rotatably connected to the rotary cover 1, and the dust-proof cap 2 may be rotatably connected to the rotary cover 1 through a pin shaft 17, to enable the dust-proof cap 2 and the rotary cover 1 to have a buckled state and a flip state. Generally, when the dust-proof cap 2 and the rotary cover 1 are in the buckled state, the dust-proof cap 2 is locked with the rotary cover 1, and the pin shaft 17 may be sleeved with a restoring spring 18, and when the dust-proof cap 2 and the rotary cover 1 are unlocked, the spring can drive the dust-proof cap 2 to rotate relative to the rotary cover 1, so that the dust-proof cap 2 rotates automatically, which facilitates opening of the dust-proof cap 2. In this embodiment, by connecting one end of the driving assembly 3 to the dust-proof cap 2, rotatably disposing the toggle member 4 on the rotary cover 1, and rotatably connecting the other end of the driving assembly 3 to the toggle member 4, the toggle member 4 can be driven to rotate, to enable the toggle member 4 to rotate to a liquid path blocked state in which the straw 11 is bent in the buckled state and rotate to a liquid path conducted state in which the straw 11 is rebounded and restored in the flip state. Therefore, the dust-proof cap 2, when opened, drives the driving assembly 3 to further drive the toggle member 4 to rotate until the straw 11 is rebounded and restored, so as to implement conduction of a liquid path of the straw 11 for a user to suck, and the dust-proof cap 2, when closed, drives the driving assembly 3 to further drive the toggle member 4 to rotate to bend the straw, so as to block the liquid path of the straw 11, thereby preventing a liquid from flowing out. In this embodiment, a force direction between the rotary cover 1 and the dust-proof cap 2 is changed by the driving assembly 3 and the toggle member 4, and the toggle member 4 is rotatably disposed on the rotary cover 1, so that after the toggle member 4 bends the straw 11, a restoring elastic force of the straw 11 is transferred to the rotary cover 1 mainly by the toggle member 4. Therefore, by reducing a stress between the rotary cover 1 and the dust-proof cap 2, water leakage due to deformation caused by an excessively large abutting force between the rotary cover 1 and dust-proof cap 2 resulted from direct clamping of the straw 11 by the rotary cover 1 and the dust-proof cap 2 can be avoided, and the quality of products is improved.

At present, for most flip type bottle covers in the market, water is drunk from rear straws 11. In other words, the straw 11 is close to a pin shaft 17, the drinking angle is not friendly, a user head needs to be tilted forward a lot, and during water drinking, the dust-proof cap 2 may top the nose or the rotary cover 1 may top the chin.

In some embodiments, the straw 11 is disposed on the rotary cover 1 at a position away from a rotation axis of the dust-proof cap 2. Specifically, the straw 11 is disposed on the rotary cover 1 at a position away from a rotation axis of the pin shaft 17. By the structure, water is drunk from a front straw 11, the straw 11 is tilted outward, the drinking angle is friendly, and during water drinking, the dust-proof cap 2 does not top the nose or the rotary cover 1 does not top the chin.

At present, straws 11 used in mainstream flip-type bottle covers are generally made of silica gel. The straws 11 stand upright by utilizing the properties and toughness of the silica gel. The upright angle is not easy to control, and the silica gel activity has a fatigue period. Over a long time use, the silica gel loses its toughness and cannot stand upright.

In some embodiments, the toggle member 4 includes a toggle plate 41, a connecting plate 42, and a fixing plate 43, the toggle plate 41 is attached to the straw 11, the fixing plate 43 is disposed on a side of the toggle plate 41 facing the fixing plate 43, the fixing plate 43 is provided with an installation hole 431 fitted with the straw 11, the installation hole 431 is provided with an installation opening 432 on a side away from the toggle plate 41, a width of the installation opening 432 is smaller than a diameter of the straw 11, the rotary cover 1 is provided with a supporting part 12, the supporting part 12 is provided with a first insertion hole 121, the connecting plate 42 is connected to the toggle plate 41, the connecting plate 42 is provided with a first rotating shaft 421 fitted with the first insertion hole 121, and the other end of the driving assembly 3 is rotatably connected to the connecting plate 42.

In this embodiment, through insertion and coordination between the first insertion hole 121 of the supporting part 12 of the rotary cover 1 and the first insertion hole 121 of the connecting plate 42 of the toggle member 4, the toggle plate 41 of the toggle member 4 is rotatably disposed on the rotary cover 1, so that rotatable connection between the toggle member 4 and the rotary cover 1 is implemented. The structure is stable and reliable, and is convenient for processing and installation. The other end of the driving assembly 3 is rotatably connected to the connecting plate 42, so that the driving assembly 3 is connected to the toggle member 4. In addition, the fixing plate 43 of this embodiment is disposed on a side of the toggle plate 41 facing the fixing plate 43, the fixing plate 43 is provided with an installation hole 431 fitted with the straw 11, a side of the installation hole 431 away from the toggle plate 41 is provided with an installation opening 432, and the straw 11 can be clamped into the installation hole 431 through the installation opening 432. Since the width of the installation opening 432 is smaller than the diameter of the straw 11, in a process of switching from the buckled state to the flip state, the fixing plate 43 can drive the straw 11 to be rebounded and restored to the liquid path conducted state, which ensures the upright angle of the straw 11, and avoids the problem of upright standing of the straw 11 due to loss of its toughness over a long time use.

In some embodiments, the dust-proof cap 2 is rotatably connected to the rotary cover 1 through a second rotating shaft 13, the driving assembly 3 includes a first driving member 31 and a second driving member 32 that are rotatably connected, the first driving member 31 is rotatably connected to the rotary cover 1 through the second rotating shaft 13, the second driving member 32 is rotatably connected to the toggle plate 41, the first driving member 31 is provided with a limiting protrusion 311, and the dust-proof cap 2 is provided with a first abutting part 21 abutted against and coordinated with the limiting protrusion 311, so that in the flip state, the first driving member 31 drives the second driving member 32 to drive the toggle plate 41 to rotate around the first rotating shaft 421 to the liquid path conducted state.

In this embodiment, specifically, the dust-proof cap 2 is rotatably connected to the rotary cover 1 through a second rotating shaft 13. In this embodiment, the first driving member 31 is rotatably connected to the rotary cover 1 through the second rotating shaft 13, the second rotating shaft 13 therefore serves as a rotating shaft of the first driving member 31, the second driving member 32 is rotatably connected to the toggle plate 41, and in a process of switching from the buckled state to the flip state, the first abutting part 21 of the dust-proof cap 2 is abutted against and coordinated with the limiting protrusion 311 of the first driving member 31, so that the first driving member 31 can drive the second driving member 32 to drive the toggle plate 41 to rotate around the first rotating shaft 421, and that the straw 11 is switched from the liquid path blocked state to the liquid path conducted state for a user to suck.

In some embodiments, the dust-proof cap 2 is provided with a second abutting part 22, and the first driving member 31 is provided with a third abutting part 312 abutted against and coordinated with the second abutting part 22, so that in the buckled state, the first driving member 31 drives the second driving member 32 to drive the toggle plate 41 to rotate around the first rotating shaft 421 to the liquid path blocked state.

In this embodiment, in a process of switching from the flip state to the buckled state, the second abutting part 22 of the dust-proof cap 2 is abutted against and coordinated with the third abutting part 312 of the first driving member 31, so that the first driving member 31 drives the second driving member 32 to drive the toggle plate 41 to rotate around the first rotating shaft 421, and that the straw 11 is switched from the liquid path conducted state to the liquid path blocked state, thereby preventing liquid leakage.

Figure 7:
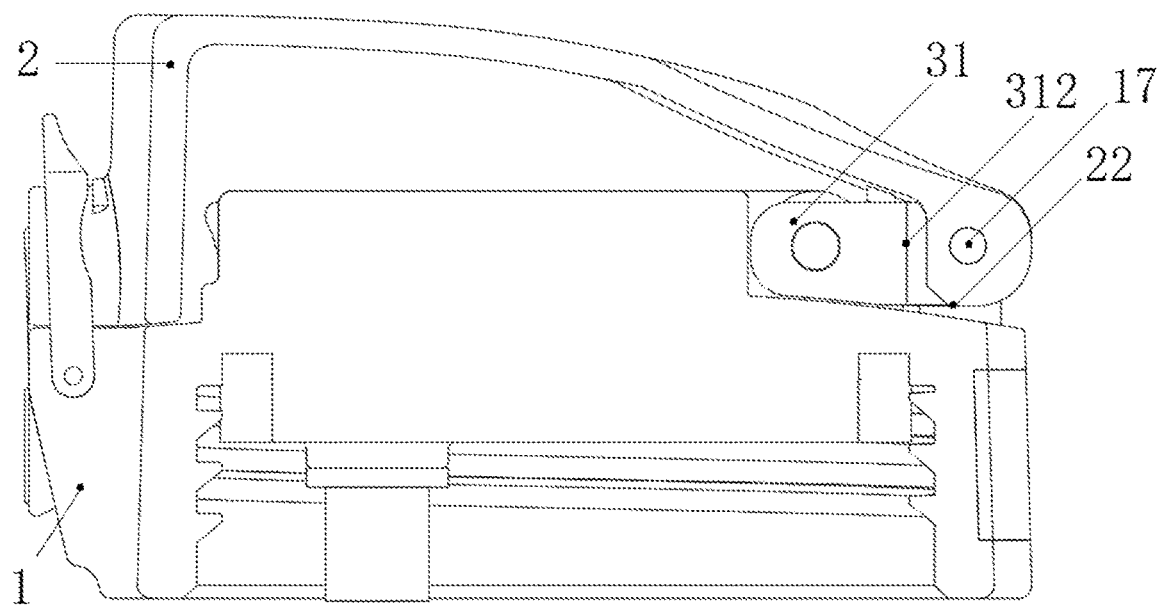
FIG. 7 is a schematic structural diagram of a cover body structure in a buckled state according to an embodiment of the present invention.
Figure 8:
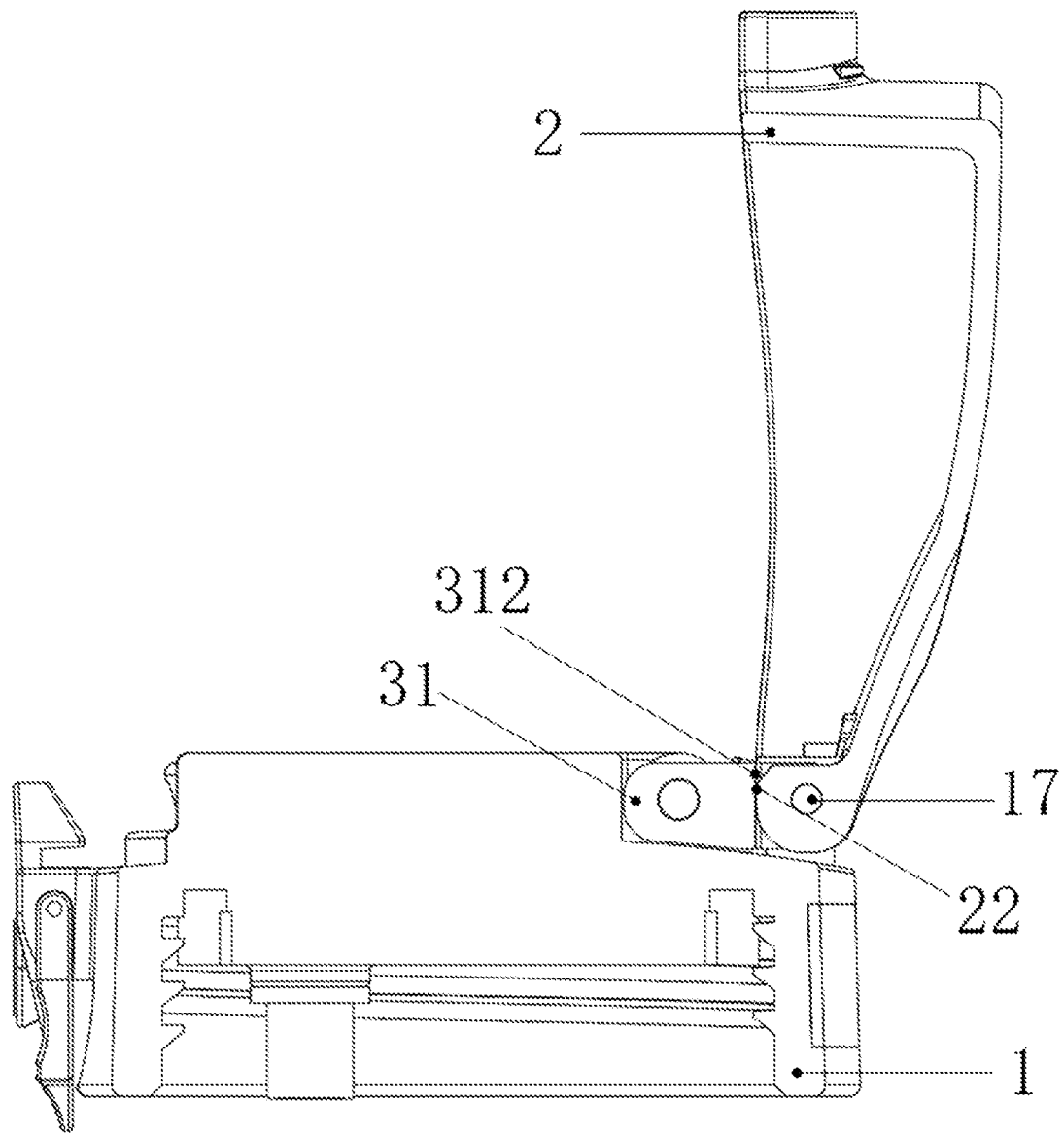
FIG. 8 is a schematic structural diagram of a cover body structure in a flip state according to an embodiment of the present invention.
Figure 9:
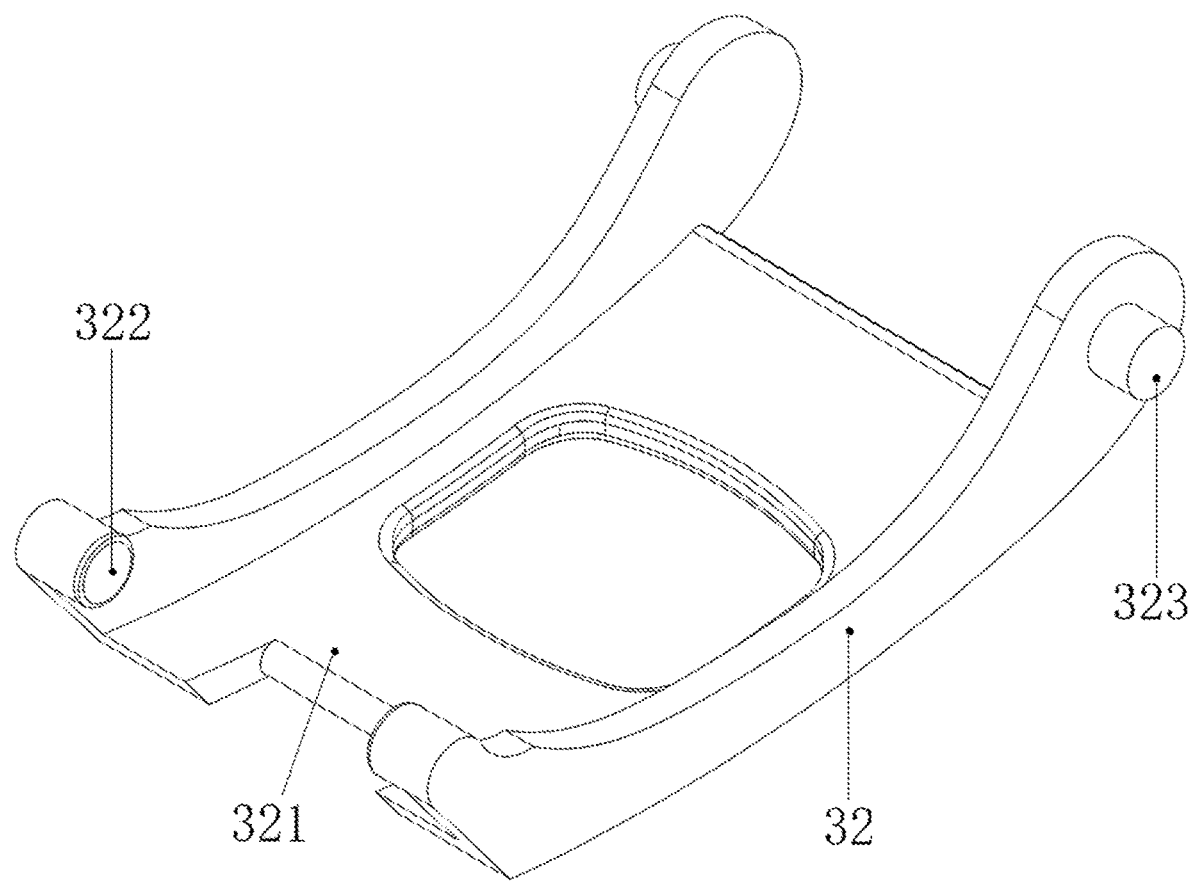
FIG. 9 is a schematic structural diagram of a second driving member of a cover body structure according to an embodiment of the present invention.
Figure 10:
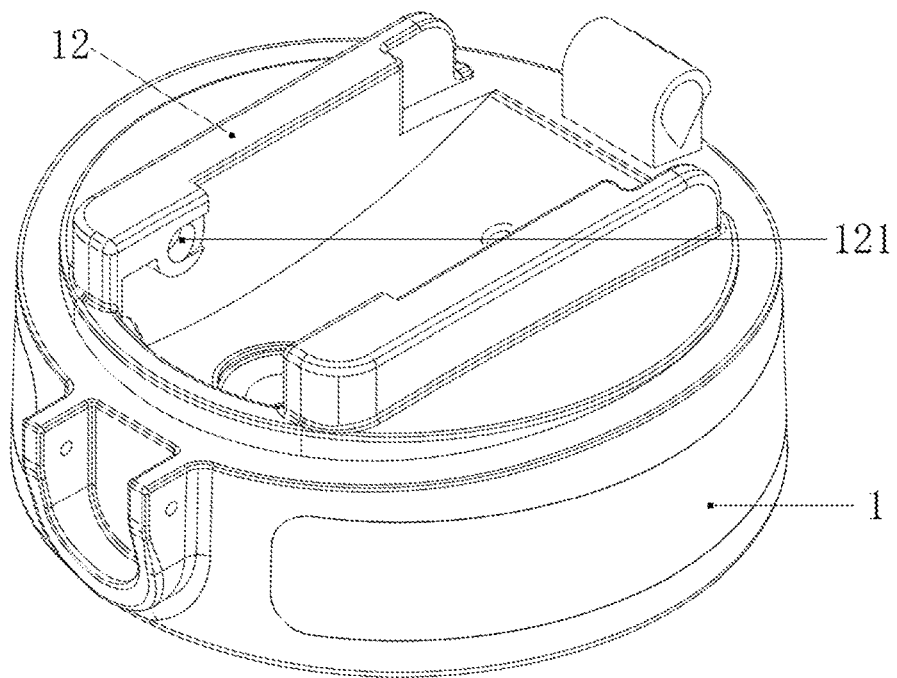
FIG. 10 is a schematic structural diagram of the second driving member of the cover body structure from another perspective according to an embodiment of the present invention.
Figure 11:
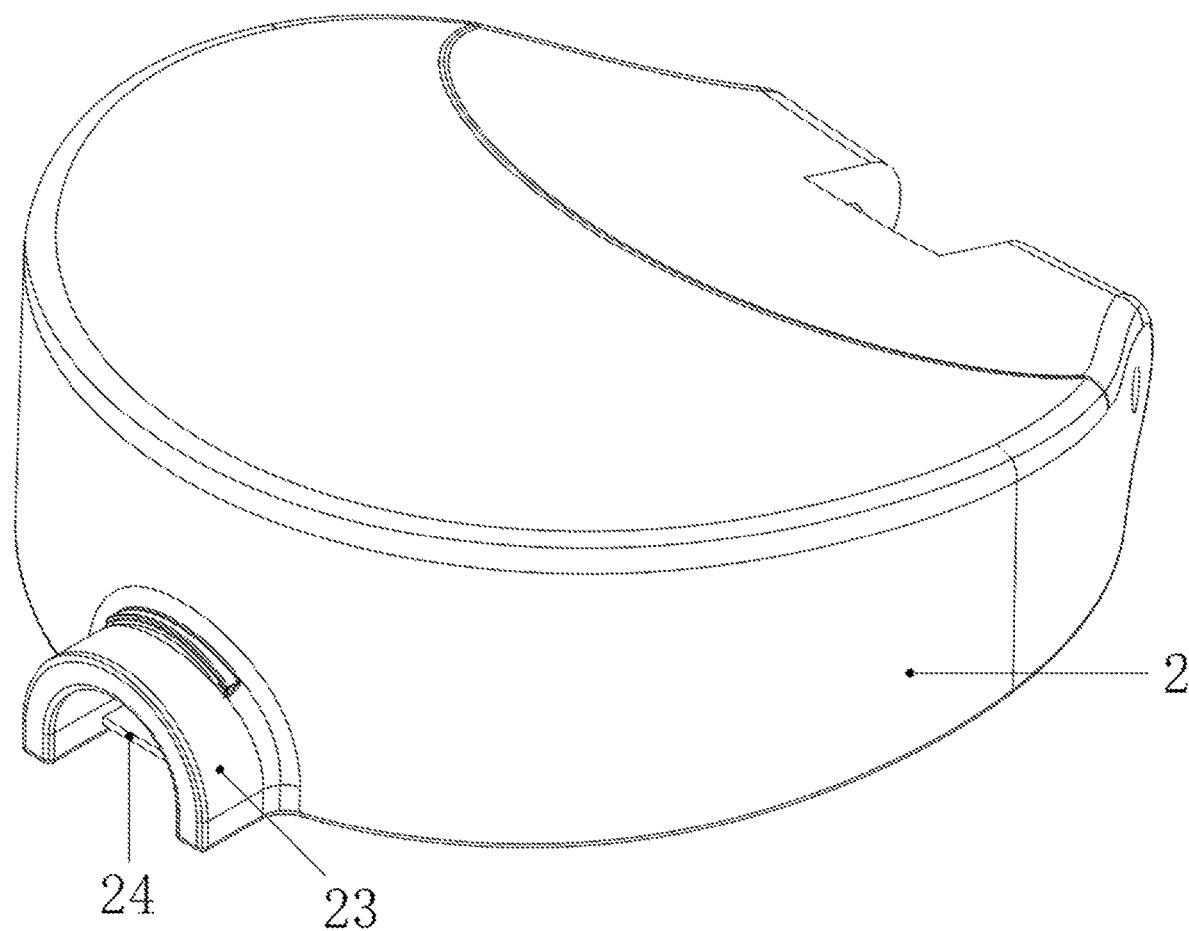
FIG. 11 is a schematic structural diagram of a rotary cover of a cover body structure according to an embodiment of the present invention.
Figure 12:
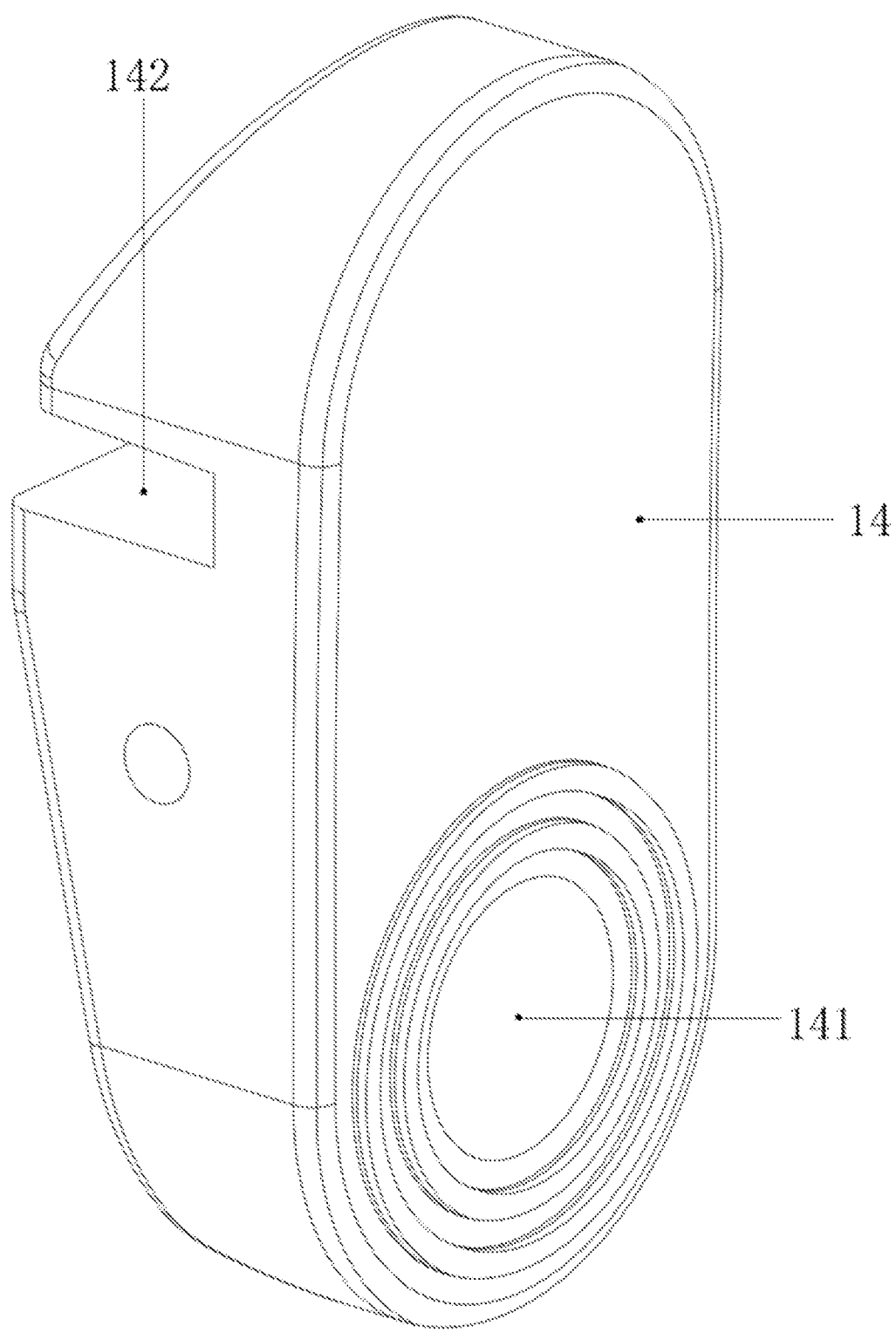
FIG. 12 is a schematic structural diagram the dust-proof cap of the cover body structure from another perspective according to an embodiment of the present invention.
Figure 13:
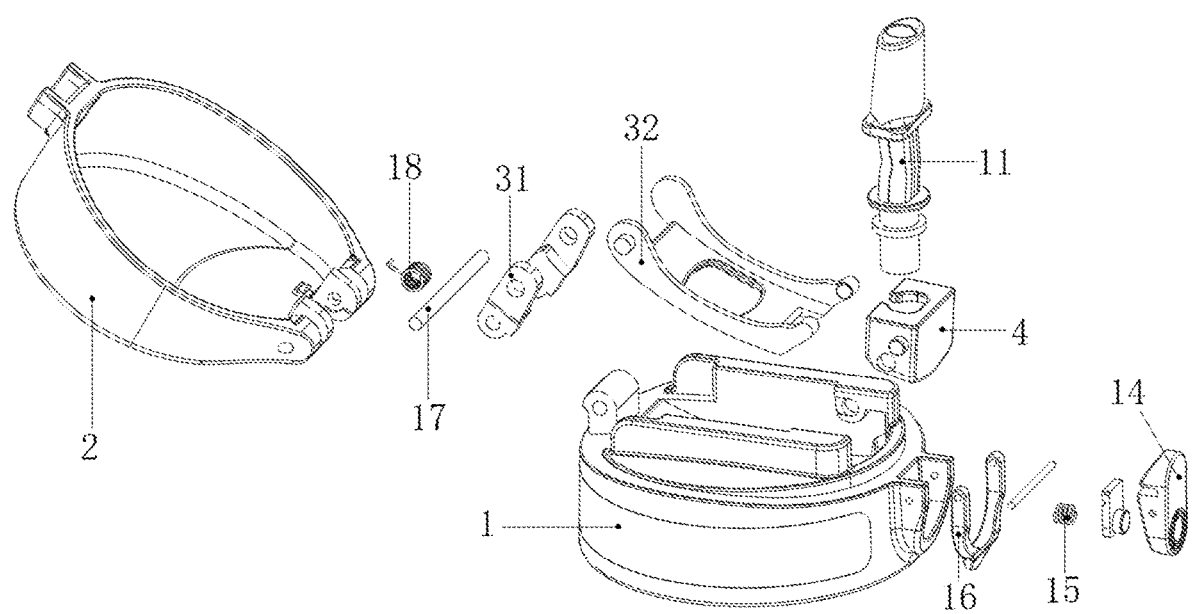
FIG. 13 is a schematic exploded structural diagram of a cover body structure according to an embodiment of the present invention.

As shown in FIG. 7 and FIG. 8, in a process of switching from the buckled state to the flip state, the dust-proof cap 2 rotates around the pin shaft 17, and further the second abutting part 22 of the dust-proof cap 2 is abutted against the third abutting part 312 of the first driving member 31; however, due to a restoring bounce force of the restoring spring 18 and the straw 11, the dust-proof cap 2 and the first driving member 31 overcome an abutting force between the second abutting part 22 and the third abutting part 312 and continue to rotate, until the second abutting part 22 is misaligned with the third abutting part 312. In a process of switching from the flip state to the buckled state, the dust-proof cap 2 rotates reversely around the pin shaft 17, when the dust-proof cap 2 is rotated until the second abutting part 22 of the dust-proof cap 2 is abutted against the third abutting part 312 of the first driving member 31, the dust-proof cap 2 may enable the first driving member 31 to drive the second driving member 32 to drive the toggle plate 41 to rotate around the first rotating shaft 421, so that the straw 11 is switched from the liquid path conducted state to the liquid path blocked state.

In some embodiments, two first driving members 31 and two second driving members 32 are included, and a connecting member 321 is arranged between the two second driving members 32, to improve the rigidity of the driving assembly 3 and ensure the reliability of driving the toggle member 4 by the driving assembly 3. The two first driving members 31 are arranged on two sides of the two second driving members 32, the two first driving members 31 are each provided with a second insertion hole 313 on a side adjacent to each other, and the two second driving members 32 are each provided with a third rotating shaft 322 fitted with the second insertion hole 313. The two first driving members 31 and the two second driving members 32 are rotatably connected to through the second insertion holes 313 of the two first driving members 31 and the third rotating shafts 322 of the two second driving members 32.

In some embodiments, two connecting plates 42 are included, the two connecting plates 42 are parallel and spaced apart on two sides of the toggle plate 41, and the toggle plate 41 is located on a side of the straw 11 away from the first driving member 31, so as to ensure that the toggle plate 41 can bend the straw 11 in the driving process; the two second driving members 32 are located between the two connecting plates 42, the two second driving members 32 facing away from are each provided with a fourth rotating shaft 323 on a side facing away from each other, and the two connecting plates 42 are each provided with a third insertion hole 422 fitted with the fourth rotating shaft 323. Through the coordination between the third insertion holes 422 of the connecting plates 42 and the fourth rotating shafts 323 of the second driving members 32, rotatable connection between the toggle member 4 and the driving assembly 3 is implemented; and by disposing two connecting plates 42 and two second driving members 32, the reliability of the connection is improved and effective transmission of a driving force is ensured.

In some embodiments, two supporting parts 12 are included, the two connecting plates 42 are located between the two supporting parts 12, the two connecting plates 42 are each provided with a first rotating shaft 421 on a side facing away from each other, and the two supporting parts 12 are each provided with a first insertion hole 121. Through the coordination between the first rotating shaft 421 of the connecting plate 42 and the first insertion hole 121 of the supporting part 12, the toggle member 4 is rotatably connected to the supporting part 12 of the rotary cover 1, and two supporting parts 12 and two connecting plates 42 are included, so that the effect of supporting the toggle member 4 by the rotary cover 1 is improved, and meanwhile effective transmission of the driving force is ensured, so that the toggle member 4 can easily bend the straw 11, and that the toggle member 4 can be prevented from being separated from the rotary cover 1.

In some embodiments, an outer wall of the rotary cover 1 is provided with a hanging buckle 24, and an outer wall of the dust-proof cap 2 is rotatably provided with a press button 14. The press button 14 is provided a hanging slot 142 fitted with the hanging buckle 24, an end of the press button 14 away from the hanging slot 142 is provided with a press part 141, a rotation axis of the press button 14 is located between the hanging slot 142 and the press part 141, and an elastic member 15 is sandwiched between the rotary cover 1 and the press part 141, so that the press part 141 of the press button 14 can be pressed to disengage the press button 14 of the rotary cover 1 from the hanging slot 142 of the dust-proof cap 2, so as to unlock the rotary cover 1 and the dust-proof cap 2.

In some embodiments, the outer wall of the rotary cover 1 is provided with a hanging part 23 extending radially outward, and the press button 14 is rotatably provided with a safety buckle 16 capable of being hung and locked with the hanging part 23, so as to prevent the rotary cover 1 and the dust-proof cap 2 from being unlocked due to accidental touch of the press part 141 of the press button 14 and also prevent opening by a child, thereby avoiding scalding of the child when the water temperature is excessively high.

Embodiment 2

An embodiment of the present invention further provides a bottle. The bottle includes the cover body structure of Embodiment 1.

In conclusion, it may be easily understood by a person skilled in the art that the foregoing technical features can be freely combined and superimposed on the premise of no conflict.

The foregoing descriptions are merely specific implementations of the present invention, but are not intended to limit the scope of protection of the present invention. Any equivalent modification or replacement can be readily figured out by a person skilled in the art within the technical scope disclosed in the present invention, and these modifications or replacements shall fall within the scope of protection of the present invention. Therefore, the scope of protection of the present invention shall be subject to the protection scope of the claims.

What is claimed is:

1. A cover body structure, wherein the cover body structure comprises:
a rotary cover (1), wherein the rotary cover (1) is provided with a straw (11);
a dust-proof cap (2), wherein the dust-proof cap (2) is rotatably connected to the rotary cover (1), to enable the dust-proof cap (2) and the rotary cover (1) to have a buckled state and a flip state;
a driving assembly (3), wherein one end of the driving assembly (3) is connected to the dust-proof cap (2); and
a toggle member (4), wherein the toggle member (4) is rotatably disposed on the rotary cover (1), and the other end of the driving assembly (3) is rotatably connected to the toggle member (4), to drive the toggle member (4) to rotate, to enable the toggle member (4) to rotate to a liquid path blocked state in which the straw (11) is bent in the buckled state and rotate to a liquid path conducted state in which the straw (11) is rebounded and restored in the flip state.

2. The cover body structure according to claim 1, wherein the straw (11) is disposed at a position where the rotary cover (1) is away from a rotation axis of the dust-proof cap (2); and/or, the toggle member (4) comprises a toggle plate (41), a connecting plate (42), and a fixing plate (43), the toggle plate (41) is attached to the straw (11), the fixing plate (43) is disposed on a side of the toggle plate (41) facing the fixing plate (43), the fixing plate (43) is provided with an installation hole (431) fitted with the straw (11), the installation hole (431) is provided with an installation opening (432) on a side away from the toggle plate (41), a width of the installation opening (432) is smaller than a diameter of the straw (11), the rotary cover (1) is provided with a supporting part (12), the supporting part (12) is provided with a first insertion hole (121), the connecting plate (42) is connected to the toggle plate (41), the connecting plate (42) is provided with a first rotating shaft (421) fitted with the first insertion hole (121), and the other end of the driving assembly (3) is rotatably connected to the connecting plate (42).

3. The cover body structure according to claim 2, wherein the dust-proof cap (2) is rotatably connected to the rotary cover (1) through a second rotating shaft (13), the driving assembly (3) comprises a first driving member (31) and a second driving member (32) that are rotatably connected, the first driving member (31) is rotatably connected to the rotary cover (1) through the second rotating shaft (13), the second driving member (32) is rotatably connected to the toggle plate (41), the first driving member (31) is provided with a limiting protrusion (311), and the dust-proof cap (2) is provided with a first abutting part (21) abutted against and coordinated with the limiting protrusion (311), so that in the flip state, the first driving member (31) drives the second driving member (32) to drive the toggle plate (41) to rotate around the first rotating shaft (421) to the liquid path conducted state.

4. The cover body structure according to claim 3, wherein the dust-proof cap (2) is provided with a second abutting part (22), and the first driving member (31) is provided with a third abutting part (312) abutted against and coordinated with the second abutting part (22), so that in the buckled state, the first driving member (31) drives the second driving member (32) to drive the toggle plate (41) to rotate around the first rotating shaft (421) to the liquid path blocked state.

5. The cover body structure according to claim 3, wherein two first driving members (31) and two second driving members (32) are comprised, a connecting member (321) is arranged between the two second driving members (32), the two first driving members (31) are arranged on two sides of the two second driving members (32), the two first driving members (31) are each provided with a second insertion hole (313) on a side approaching each other, and the two second driving members (32) are each provided with a third rotating shaft (322) fitted with the second insertion hole (313).

6. The cover body structure according to claim 5, wherein two connecting plates (42) are comprised, the two connecting plates (42) are arranged in parallel and spaced apart on two sides of the toggle plate (41), the toggle plate (41) is located on a side of the straw (11) away from the first driving member (31), the two second driving members (32) are located between the two connecting plates (42), the two second driving members (32) are each provided with a fourth rotating shaft (323) on a side facing away from each other, and the two connecting plates (42) are each provided with a third insertion hole (422) fitted with the fourth rotating shaft (323).

7. The cover body structure according to claim 6, wherein two supporting parts (12) are comprised, the two connecting plates (42) are located between the two supporting parts (12), the two connecting plates (42) are each provided with the first rotating shaft (421) on a side facing away from each other, and the two supporting parts (12) are each provided with the first insertion hole (121).

8. The cover body structure according to claim 1, wherein an outer wall of the dust-proof cap (2) is provided with a hanging buckle (24), an outer wall of the rotary cover (1) is rotatably provided with a press button (14), the press button (14) is provided with a hanging slot (142) fitted with the hanging buckle (24), an end of the press button (14) away from the hanging slot (142) is provided with a press part (141), a rotation axis of the press button (14) is located between the hanging slot (142) and the press part (141), and an elastic member (15) is sandwiched between the rotary cover (1) and the press part (141).

9. The cover body structure according to claim 8, wherein the outer wall of the dust-proof cap (2) is provided with a hanging part (23) extending radially outward, and the press button (14) is rotatably provided with a safety buckle (16) capable of being hung and locked with the hanging part (23).

10. A bottle, wherein the bottle comprises the cover body structure according to claim 1.

11. The bottle according to claim 10, wherein the straw (11) is disposed at a position where the rotary cover (1) is away from a rotation axis of the dust-proof cap (2); and/or, the toggle member (4) comprises a toggle plate (41), a connecting plate (42), and a fixing plate (43), the toggle plate (41) is attached to the straw (11), the fixing plate (43) is disposed on a side of the toggle plate (41) facing the fixing plate (43), the fixing plate (43) is provided with an installation hole (431) fitted with the straw (11), the installation hole (431) is provided with an installation opening (432) on a side away from the toggle plate (41), a width of the installation opening (432) is smaller than a diameter of the straw (11), the rotary cover (1) is provided with a supporting part (12), the supporting part (12) is provided with a first insertion hole (121), the connecting plate (42) is connected to the toggle plate (41), the connecting plate (42) is provided with a first rotating shaft (421) fitted with the first insertion hole (121), and the other end of the driving assembly (3) is rotatably connected to the connecting plate (42).

12. The bottle according to claim 11, wherein the dust-proof cap (2) is rotatably connected to the rotary cover (1) through a second rotating shaft (13), the driving assembly (3) comprises a first driving member (31) and a second driving member (32) that are rotatably connected, the first driving member (31) is rotatably connected to the rotary cover (1) through the second rotating shaft (13), the second driving member (32) is rotatably connected to the toggle plate (41), the first driving member (31) is provided with a limiting protrusion (311), and the dust-proof cap (2) is provided with a first abutting part (21) abutted against and coordinated with the limiting protrusion (311), so that in the flip state, the first driving member (31) drives the second driving member (32) to drive the toggle plate (41) to rotate around the first rotating shaft (421) to the liquid path conducted state.

13. The bottle according to claim 12, wherein the dust-proof cap (2) is provided with a second abutting part (22), and the first driving member (31) is provided with a third abutting part (312) abutted against and coordinated with the second abutting part (22), so that in the buckled state, the first driving member (31) drives the second driving member (32) to drive the toggle plate (41) to rotate around the first rotating shaft (421) to the liquid path blocked state.

14. The bottle according to claim 12, wherein two first driving members (31) and two second driving members (32) are comprised, a connecting member (321) is arranged between the two second driving members (32), the two first driving members (31) are arranged on two sides of the two second driving members (32), the two first driving members (31) are each provided with a second insertion hole (313) on a side approaching each other, and the two second driving members (32) are each provided with a third rotating shaft (322) fitted with the second insertion hole (313).

15. The bottle according to claim 14, wherein two connecting plates (42) are comprised, the two connecting plates (42) are arranged in parallel and spaced apart on two sides of the toggle plate (41), the toggle plate (41) is located on a side of the straw (11) away from the first driving member (31), the two second driving members (32) are located between the two connecting plates (42), the two second driving members (32) are each provided with a fourth rotating shaft (323) on a side facing away from each other, and the two connecting plates (42) are each provided with a third insertion hole (422) fitted with the fourth rotating shaft (323).

16. The bottle according to claim 15, wherein two supporting parts (12) are comprised, the two connecting plates (42) are located between the two supporting parts (12), the two connecting plates (42) are each provided with the first rotating shaft (421) on a side facing away from each other, and the two supporting parts (12) are each provided with the first insertion hole (121).

17. The bottle according to claim 10, wherein an outer wall of the dust-proof cap (2) is provided with a hanging buckle (24), an outer wall of the rotary cover (1) is rotatably provided with a press button (14), the press button (14) is provided with a hanging slot (142) fitted with the hanging buckle (24), an end of the press button (14) away from the hanging slot (142) is provided with a press part (141), a rotation axis of the press button (14) is located between the hanging slot (142) and the press part (141), and an elastic member (15) is sandwiched between the rotary cover (1) and the press part (141).

18. The bottle according to claim 17, wherein the outer wall of the dust-proof cap (2) is provided with a hanging part (23) extending radially outward, and the press button (14) is rotatably provided with a safety buckle (16) capable of being hung and locked with the hanging part (23).

* * * * *